Patented Mar. 24, 1953

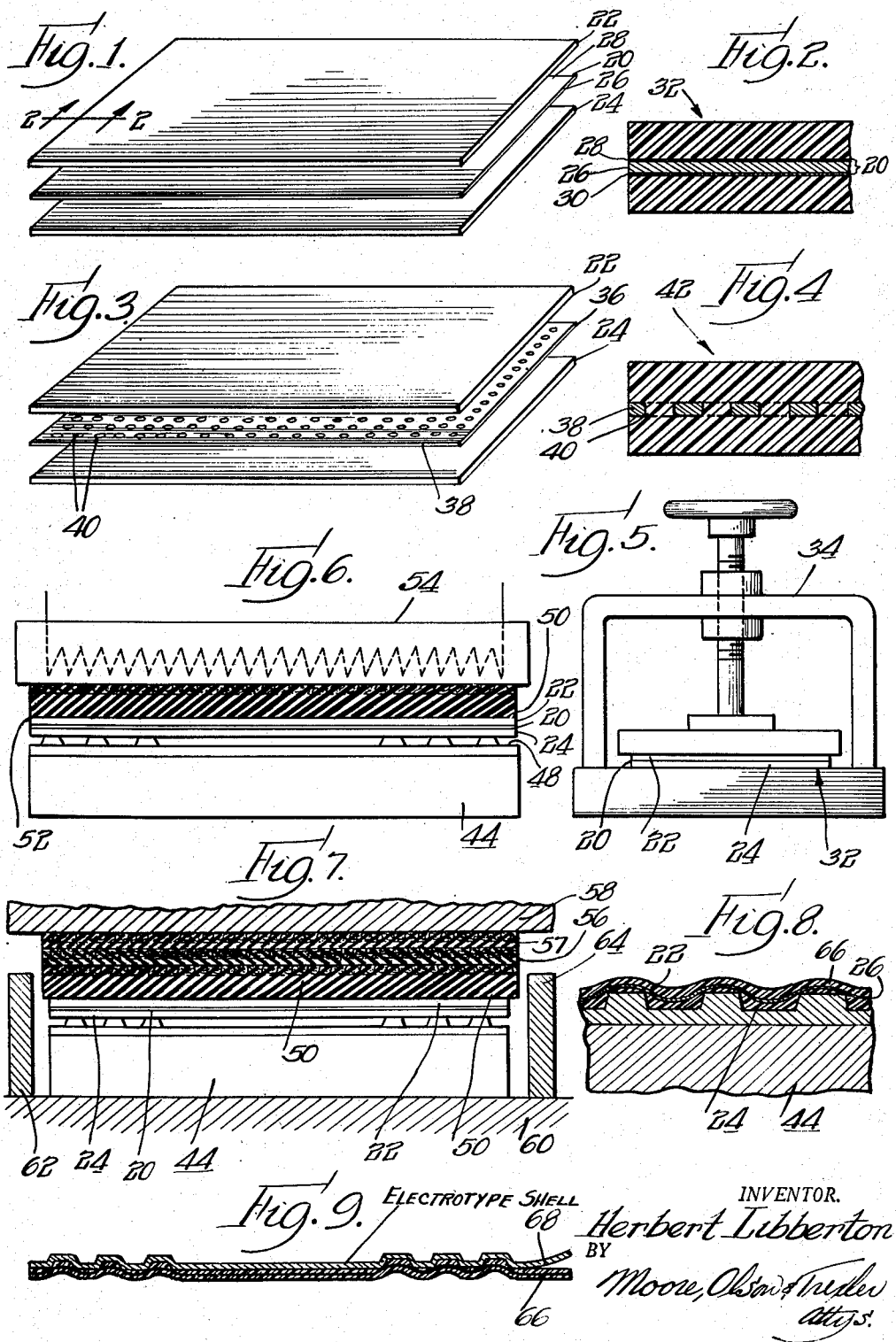

2,632,722

UNITED STATES PATENT OFFICE 2,632,722

MOLDABLE TABLET

Herbert Libberton, Chicago, Ill., assignor to Tenak Products Company, Chicago, Ill., a corporation of Illinois Application February 27, 1948, Serial No. 11,713

7 Claims. (Cl. 154—46.5)

This invention relates in general to the art of printing. More particularly, it relates to a moldable tablet and to methods of making and using the same in the manufacture of electrotype printing plates.

It is a serious disadvantage of many synthetic resinous materials which have been proposed for use in moldable tablets employed in the formation of electrotypes that they show a decided shrinkage after molding even when cooled to ordinary temperature in contact with the pattern. As a consequence of this shrinkage the molds will not register exactly with the pattern from which they are formed and in addition because the shrinkage is not the same in all molds, two molds of the same type material formed from the same pattern will not register and in fact, because a further change in the dimensions sometimes occurs in plating, successive electrotype shells plated on the same mold will not always register.

Such change in dimensions of the molding materials due to shrinkage is a particularly serious problem where the electrotype printing plates are to be employed in multicolor printing. In this connection it is important to bear in mind that shrinkage of two or more molds is not usually equal even when the molds are made of the same material. In such multicolor printing accurate registry of the various printing plates for each of the colors is essential if a good multicolor printing job is to be done. For this reason moldable tablets formed of the synthetic resinous materials have not found general use in the manufacture of electrotypes for use in multicolor printing and the industry has found it necessary to continue with the use of other types of molds, such as lead molds or cold molding material tablets, for this purpose despite the known disadvantages of these other types of molds and the known advantage of the synthetic resinous material molds that they can be re-used.

It is an object of this invention to provide a moldable tablet comprising a moldable thermoplastic synthetic resinous composition, which tablet when molded will still register accurately with the pattern from which it is formed after standing for long periods following its separation from the pattern from which it is formed and even after an electrotype shell has been plated on the molded tablet and removed therefrom whereby electrotype printing plates made with such molds will register accurately with each other.

A further object is to provide a method of making such moldable tablets.

Still another object is to provide a method of making electrotypes with the aid of such moldable tablets.

Still another object is to provide a molded tablet comprising a moldable thermoplastic synthetic resinous composition, which molded tablet registers accurately with the pattern from which it has been formed even after standing for long periods following its separation from the pattern, and even after an electrotype shell has been plated on the molded tablet and removed therefrom.

A still further object is to provide a method of making such molded tablets. Another object is to provide a method of making such molded tablets in which the elements of the molded tablet are at least in part united at the same time that the tablet is molded.

A still further object is to provide portions of such a moldable tablet comprising two or more elements of the tablet in assembled form preparatory to a single final step of forming the composite structure which constitutes the tablet.

Other objects will appear hereinafter.

It has now been found that the foregoing objects are accomplished by securing to a layer of synthetic resinous material moldable at elevated temperature and pressure and having a thermoplastic base means for preventing substantial shrinkage of said layer of resinous material after molding at elevated temperature and pressure and for preventing substantial warping of the structure after it has been molded at elevated temperature and pressure. Generally the means for preventing warping of the structure or tablet is separate from the means for preventing shrinking and is carried thereby and serves to balance the warping tendency of the combination of the layer of moldable material and the means for preventing shrinking and the advantages of the invention are more fully realized when both the means for preventing warping and the means for preventing shrinking are deformable under conditions of temperature and pressure at which the said synthetic resinous material is moldable to the image of an electrotype, that is both these means should be of such character that they deform during molding so as to roughly follow the contour of the molded face of the tablet after molding.

More particularly, it has been found that very satisfactory means for preventing shrinking of the layer of synthetic resinous material is a core layer secured to one surface of the layer of synthetic resinous material, which core layer includes a layer of soft sheet metal which is deformable as explained above under conditions of temperature and pressure at which said synthetic resinous material is moldable to the image of an electrotype. The layer of synthetic resinous material is held tightly against the core layer and is secured against substantial lateral displacement with respect to the metal layer under ordinary temperature and pressure conditions and preferably against such displacement at elevated temperatures up to about 150° F., thereby insuring that there will be no substantial shrinkage of the layer of synthetic resinous material after molding at elevated temperature and pressure and in the preferred form insuring against such shrinkage even when the molded tablet is exposed to temperatures as high as 150° F. Such an assembly of synthetic resinous material and the core layer, however, has a tendency to become warped, and accordingly means is provided on the surface of the core layer opposite to that carrying the synthetic resinous material for preventing substantial warping of the tablet. Such means for preventing warping is preferably a layer of synthetic resinous material also held tightly against the core layer. Such a layer of synthetic resinous material provides a balance against the layer on the opposite face of the core layer. In other words, a preferred embodiment of the invention comprises a core layer including a layer of soft sheet metal deformable as described above, which core layer is sandwiched tightly between layers of the above described synthetic resinous material, the said layers of synthetic resinous material being secured against substantial lateral displacement with respect to the metal layer under ordinary temperature and pressure conditions and preferably also at elevated temperatures up to about 150° F., but not necessarily against some lateral displacement of this type during molding.

While the invention is not intended to be limited to the use of two layers of synthetic resinous material in combination with the core layer, it has been found that two layers do give a particularly good structure especially when the two layers are formed of the same synthetic resinous material and have substantially the same thickness and have a substantially uniform thickness throughout their areas prior to molding.

Although it is within the scope of the invention to employ as the thermoplastic synthetic resinous material moldable at elevated temperature and pressure a composition having any desired thermoplastic resin as a base, such as solid copolymers of vinyl chloride and vinyl acetate, solid copolymers of methyl methacrylate and other similar acrylic resinous materials, it has been found that a tablet having exceptional molding properties is obtained when the solid copolymers of vinyl chloride and vinylidene chloride containing less than about 20% of vinylidene chloride and preferably less than 10% vinylidene chloride are employed.

In order that the invention may be better understood reference is made to the accompanying drawing which forms a part of the specification and in which Fig. 1 is an exploded view in perspective showing the elements of a moldable tablet embodying the present invention;

Fig. 2 is an enlarged detailed fragmentary view in cross section of a moldable tablet formed from the elements shown in Fig. 1, the cross section being taken on a line corresponding to the line 2—2 in Fig. 1;

Fig. 3 is a view similar to Fig. 1 showing the elements of another embodiment of the invention;

Fig. 4 is a view similar to Fig. 2 of a tablet formed from the elements illustrated in Fig. 3;

Fig. 5 is a view in elevation of a press showing the moldable tablet being formed from the elements illustrated in Fig. 1;

Fig. 6 is a fragmentary view in elevation illustrating the step of heating the tablet or the elements thereof preparatory to molding the tablet against a pattern;

Fig. 7 is a fragmentary view in elevation illustrating the step of pressing the tablet or the elements thereof against a pattern to mold the tablet;

Fig. 8 is an enlarged detailed view in cross section showing the tablet molded against the pattern; and Fig. 9 is a view in cross section showing the molded tablet after it has been separated from the pattern and after an electrotype shell has been plated thereon.

Fig. 1 shows the elements of a preferred tablet structure which include a core layer 20 and two layers 22 and 24 of thermoplastic synthetic resinous material. The core layer 20 as shown consists of a piece of soft sheet metal 26 preferably aluminum having a thickness of about .005 inch and carrying on each face layers of adhesive 28 and 30 (see Fig. 2). Any desired adhesive may be used which is capable of securing the layers of resinous material 22 and 24 tightly against the layer of sheet metal 26 and which also has the property of preventing substantial lateral displacement of the layers 22 and 24 with respect to the metal layer 26 under ordinary temperature and pressure conditions, that is at room temperature and atmospheric pressure. Preferably, however, the adhesive should be one which will prevent such lateral displacement even at some elevated temperatures such as those encountered in hot plating baths used in forming electrotype shells in which the temperature may reach 150° F. adjacent the surface where the metal is being deposited.

A thermoplastic adhesive sold under the trade name "Pliobond," which is a mixture of a phenolic resin and synthetic rubber, for example, cyclized rubber, and which is applied in the form of a solution in a volatile solvent for the adhesive, has been found to meet the requirements set out above very satisfactorily, particularly where the metal layer is sheet aluminum and the thermoplastic synthetic resinous molding material has the above described vinyl chloride-vinylidene chloride copolymer material as a base. In accordance with the preferred procedure this adhesive or any other suitable adhesive as indicated above is applied to both surfaces of the sheet metal layer 26 until both these surfaces are completely coated with the adhesive. The solvent, if the adhesive is in solution as is the Pliobond above described, is then driven off. The adhesive coated metal sheet designated generally 20 and forming the core layer may then be used immediately or stored for future use. Such prepared adhesive coated metal sheets are particularly advantageous where the tablet is assembled and molded in a single operation as hereinafter described. Although for carrying out the process of assembling and molding in a single operation it is preferable to prepare the layer of sheet metal coated with adhesive and forming a core 20 in a preliminary step, it is within the scope of the invention to apply the adhesive to one face of each of the layers of synthetic resinous material 22 and 24. It should also be understood that when the adhesive to be used is not in the form of a solution in a volatile solvent and is applied for example as a hot melt adhesive it may be applied hot either to the resinous material or preferably to the sheet metal layer 26 as described above while it is hot and then used immediately or allowed to cool and harden in order to store the adhesive coated elements and have them in readiness for prompt assembly of tablet structure when desired.

The assembly of the sheets 24 and 26 with the core layer 20 to form a tablet designated generally 32 as illustrated in Fig. 2 may be carried out in any desired way. Preferably it is accomplished under pressure in a press such as the press 34 as illustrated in Fig. 5. In the case of an adhesive such as the Pliobond described above, which is thermoplastic, the assembly prior to placing it in the press is preferably heated to a temperature sufficient to make the adhesive active, for example, in the case of Pliobond to a temperature of about 200° F. The assembly forming the tablet 32 is preferably held in the press 34 until the adhesive has cooled sufficiently to become hard in the case of a thermoplastic adhesive. In the light of the foregoing it will be readily apparent how to form the tablet 32 with the aid of other types of adhesives and in other ways with thermoplastic adhesives.

Figs. 3 and 4 illustrate another embodiment of the invention in which sheets 22 and 24 of moldable thermoplastic synthetic resinous material like those shown in Fig. 1 are used. The structure also includes a core layer but this core layer designated 36 differs from the core layer shown in Fig. 1. The core layer 36 is formed of a layer of the same type of sheet metal 38 as that described above for the layer 26, but instead of being solid like the layer 36 the sheet metal layer is provided with perforations 40. These perforations may, for example, be round and have a diameter of the order of 1/8" and occupy 1/4 of the total area of the sheet 38. The perforations 40 are preferably uniformly distributed throughout the area of the sheet 38 since it is through these perforations that the sheets 22 and 24 are tightly secured against the sheet metal 38 and secured against substantial lateral displacement with respect to the sheet 38. In this structure no adhesive is used. Instead the sheets 22 and 24 after being heated to an elevated temperature sufficient to make the material of the sheets flowable and tacky enough so that the material of the two sheets will unite are pressed in a press such as the press 34 under high pressure against the opposite faces of the sheet metal layer 38 thereby forcing the material of the sheets 22 and 24 through the perforations 40 until the material of the sheets 22 and 24 through the perforations 40 unites to form a single body of resinous material joined through the perforations 40 as illustrated in the tablet 42 shown in Fig. 4. For example, in the case of a thermoplastic synthetic resinous material having as a base the above described vinyl chloride-vinylidene chloride copolymer material a pressure of about 1,000 pounds per square inch at a temperature of about 165° F. would be satisfactory.

A preferred procedure for making tablets such as the tablet 32 on a large scale involves continuously coating a strip of soft deformable sheet metal, such as the above described aluminum sheet, with a hot melt adhesive on both faces and feeding this coated sheet or core layer between two layers of synthetic resinous material such as layers 22 and 24 being continuously delivered from calender rolls and then passing the assembly of layers 22 and 24 and core layer 20 through an intermittently operating press in which sections of the continuous assembly are successively pressed together to form the tablet material 32.

Fig. 6 illustrates a preferred method of heating either a formed tablet such as the tablet 32 or the tablet 42 preparatory to molding or an assembly of sheets of resinous material such as 22 and 24 and a core such as the core 20 or 36 preparatory to simultaneously molding and forming the sheets of resinous material and core into a tablet. This step and subsequent molding procedure will be described with particular reference to simultaneous molding and forming of the tablet structure and it should be understood that the procedure also applies where a preformed tablet such as 32 or 42 is employed.

For the molding operation a pattern such as the pattern 44 from which an electrotype is to be made is preferably arranged with its formed face 48 uppermost as illustrated in Fig. 6. The assembly of sheets 22 and 24 with a core layer 20 therebetween (or a tablet such as 32 or 42) is arranged over the form face 48 and over this it is preferable to lay a blanket 50. Preferably the blanket 50 is a Tingue-Brown Combino blanket which is a rubberized fabric backing carrying a synthetic rubber facing and which has a thickness of about 81 mils, although other equivalent blanket material may be used and the thickness of the blanket may also vary both above and below 81 mils. It is also desirable to insert a separator such as a sheet of cellophane 52 between the layer 22 and the blanket 50. Suitable heating means such as the electrically heated hot plate 54 is then laid over the rubber blanket 50. It has been found that good results are obtained when the surface of the hot plate is maintained at about 300° F. where the sheets of resinous material 22 and 24 have as a base the above described vinyl chloride-vinylidene chloride copolymer material. With the hot plate at this temperature the preferred resinous material described above will be adequately heated in about 85 to 90 seconds under the conditions described.

The hot plate 54 is then removed and the assembly including the pattern 44, the sheets 22 and 24, the core 20, cellophane 22 and the blanket 50 are placed in a press with cold platens and preferably after laying additional blanket material, such as blankets 56 and 57, over the rubber blanket 50, the press is closed. It is preferred that the additional blanket material be two blankets 56 and 57 each about 38 mils thick and both being of the type described above, that is Tingue-Brown Combino blankets, although such blankets 56 and 57 may be replaced with other equivalent material and the total thickness of the blanket material may be both greater or less than the total thickness of blankets 56 and 57, which is 76 mils. Following the removal of the hot plate 54 the succeeding operations up through the closing of the press should be carried out with reasonable speed so that the moldable material will still be sufficiently hot to mold satisfactorily.

Fig. 7 illustrates the pressing operation. In this figure only the upper and lower platens 58 and 60 of the press are shown and these are shown in a partly open position. To obtain accurate molding the platens 58 and 60 of the press are preferably closed against stops such as stops 62 and 64 of predetermined height, or to a predetermined distance between blankets 58 and 60 as indicated for example by a depth gauge on the press, although a skilled operator can generally produce very satisfactory molds by applying a predetermined pressure which will vary somewhat depending upon the character of the form or pattern. For example, it has been found that with the preferred molding material composition hereinafter described a tablet such as the tablet 32 having layers of moldable material each about .020 inch thick and a sheet aluminum core about .005 inch thick, a pressure of 1,000 pounds per square inch will mold the tablet 32 satisfactorily against the pattern producing a penetration of about 10 mils which has been found to give good reproduction in the case of the average pattern which is considered to consist of about one-third half-tone area and two-thirds type area. When the half-tone area of the pattern is greater than about one-third, then the operator will apply a pressure somewhat above 1,000 pounds per square inch to obtain the same penetration of about 10 mils which he can judge quite accurately if he is skillful and similarly will apply somewhat lower pressure where the pattern is more than two-thirds type area. It is quite easy to determine the proper height of the stops 62 and 64 or the proper reading on a depth gauge by trial and error in the case of any given combination of the pattern, moldable tablet and blankets.

After the platens 58 and 60 of the press have been closed against the stops 62 and 64 it is preferable to retain them in closed position for about one minute where the pattern includes wood backed half tones in order to permit the moldable material to cool sufficiently so that after it is separated from the pattern it will still continue to register accurately therewith. Somewhat less cooling time is required where the pattern is made up entirely of type so that it is all metal.

When sufficient cooling has taken place the press is opened and after the blankets 56 and 57 and cellophane 52 have been removed the tablet and pattern appear as illustrated in Fig. 8. It will be seen that the molded tablet 66 has been caused to conform very accurately with the face 48 of the pattern 44 and that the sheet metal 26 and the layer of resinous material 22 on the rear face of the tablet 66 have also been deformed, although to a lesser degree than the layer of resinous material 24 on the molded face of the tablet 66.

The tablet 66 is now separated from the pattern 44 which is very easily accomplished and is then ready to be suspended in the usual electrotype bath after proper preparation in the known manner and plated to form an electrotype shell thereon. Electrotypes may be formed on the molded tablet in any desired way but in accordance with the preferred procedure the molded face of the tablet is first coated with a very thin film of silver, for example, by chemical deposition from a solution of a silver salt sprayed onto the molded face of the tablet. With the tablet thus rendered conductive, it is suspended in a plating bath and a layer of copper and/or nickel is then plated over the silver to the desired thickness. The tablet 66 after an electrotype shell 68 is plated thereon appears as illustrated in Fig. 9. The shell 68 may be very readily separated from the tablet 66 as illustrated in this Fig. 9.

It has been pointed out above that any soft sheet metal deformable under conditions of temperature and pressure at which the synthetic resinous material is moldable to the image of an electrotype may be employed in the core layer. By way of illustration it is pointed out that soft sheet copper or soft sheet zinc may be used. Soft sheet aluminum, however, is the preferred sheet metal to employ in the core layer since it has been found to give particularly good results.

While it is generally desirable both from the cost standpoint and the weight standpoint to use as thin a sheet metal layer as will adequately prevent shrinkage of the synthetic resinous material, it is within the scope of the invention to use sheet metal of various thicknesses. Because of the differences in the strengths of various kinds of metal the range of useable thicknesses may be different for different materials. The maximum usable thickness is the maximum thickness that is deformable as described above. In the case of the metals specifically named above a .001 inch thick sheet is about as thin a sheet of any of the metals as is usable and about .008 inch is about the maximum usable thickness for any of the metals. Preferably the metal sheets will be from about .003 inch to .006 inch thick. These ranges of dimensions are particularly applicable where the preferred thermoplastic synthetic resinous material described above and hereinafter which has as its base copolymers of vinyl chloride and vinylidene chloride containing less than about 20% vinylidene chloride is used. The usable thicknesses of sheet metal will vary somewhat from the above figures if the molding compositions are substantially softer or substantially stiffer than the preferred composition.

The thickness of the layers of synthetic resinous material may also vary within the scope of the invention. Referring particularly to the preferred synthetic resinous material mentioned repeatedly herein, it is pointed out that about .020 inch is a satisfactory thickness for each layer of synthetic resinous material. Somewhat thinner layers can be used, but as the thicknesses decrease below about .020 inch there is an increase in the tendency to produce molds which do not accurately correspond to the pattern and with thicknesses of about .015 inch and less there is danger of penetrating to the metal layer or at least very close to it. Thicknesses greater than .020 inch may be used as desired. For example, satisfactory tablets have been made with the preferred molding composition with sheets of the molding composition as thick as .028 inch. On the other hand the use of a greater thickness of synthetic resinous material than is required to form good molds in general serves only to increase the cost and waste material.

A molding composition which has been found to be a particularly good composition from which to form the layers 22 and 24 is formed by mixing the following ingredients together on a rubber mill with the rolls heated to a temperature of about 225° F.; 7½ pounds of a solid vinyl chloride-vinylidene chloride copolymer composition containing less than about 20% of vinylidene chloride and having a specific gravity of about 1.44 and a specific viscosity of 0.30 measured at 20° C. on a 0.4% solution in nitrobenzene, 6 ounces of basic lead carbonate, 7½ ounces of dicyclohexyl phthalate, 10½ grams of stearic acid, 21 grams of lithium stearate, 26 grams of carbon black (raven black), and 1 pound, 2 ounces of a mixture of about equal weights of gamma polyvinyl chloride and a butadiene-acrylonitrile copolymer composition containing about 55 parts by weight of butadiene-1, 3 and about 45 parts by weight of acrylonitrile. This composition, after being thoroughly mixed on the rubber mill is then sheeted out on calender rolls to the desired thickness of about .020 inch and is then ready for use in forming the moldable tablet as described above.

The preferred thermoplastic synthetic resinous material containing the above described vinyl chloride-vinylidene chloride copolymer composition which are used as the moldable material in the moldable tablet described herein in addition to the vinyl chloride-vinylidene chloride copolymer will ordinarily contain the various ingredients listed above or their equivalents, although the proportions may be varied. The basic lead carbonate is added principally as a stabilizer for the vinyl chloride-vinylidene chloride copolymer which latter tends to decompose when heated to elevated temperatures in the absence of such stabilizing material. Other stabilizers may be used in place of the lead carbonate, however, and the quantity of stabilizer may be varied both above and below the amount specified in the above formula. The dicyclohexyl phthalate functions primarily as a plasticizer permitting the composition to be molded satisfactorily at lower temperature than would otherwise be possible. Both greater and lesser amounts of this or other plasticizers may be used in place of the particular amount set out in the above formula.

The stearic acid and lithium stearate together function as a release agent or a parting material and also give better milling properties to the composition. A parting material in the composition is desirable in order to give better separation of the molded tablet from an electrotype shell formed thereon. A quantity of parting material sufficient for this purpose is preferably included in the compositions although the amount may be varied from those given in the above formula and other parting material or parting materials may be used in place of the stearic acid and lithium stearate or one of these two may be used alone as desired.

The small amount of carbon black present in the above composition is sufficient to give the composition a desired dark color. It may be included or omitted as desired or replaced with or supplemented by other coloring material which does not adversely affect the molding characteristics of the composition.

Lastly, the mixture of gamma polyvinyl chloride and butadiene-acrylonitrile copolymer is a material sold under the trade name "Polyblend." Its presence renders the composition both somewhat tougher and somewhat softer, that is, it improves the molding properties. It makes the composition mill better when the mix is being made up and gives a smoother calendered surface with fewer pits than is obtained when this material is omitted. While the presence of this polymer mixture is preferred, it will be understood that mixtures of the same polymers in different proportions or mixtures of the vinyl chloride polymer with copolymers of butadiene and acrylonitrile containing proportions of these materials other than those set out above, or in general that any other equivalent materials may be used in place of the particular "Polyblend" described above and that the amount of this polymer mixture may be varied. The preferred amounts of the above described "Polyblend" are from about 10% to about 20% by weight based on the weight of the vinyl chloride-vinylidene chloride copolymer. In this connection it is further pointed out that it is preferable that the moldable material should contain from about 75% to about 80% by weight of the vinyl chloride-vinylidene chloride copolymer.

The present invention has the advantage of providing a moldable tablet adapted to be used in the preparation of electrotypes which is readily molded against a pattern to give a highly accurate impression of the pattern and which at the same time is substantially free of any tendency to shrink after separation from the pattern, especially after it is maintained in contact therewith until it has cooled well below molding temperature. The shrinkage if any is so slight that tablets molded from a given pattern will register accurately with each other after standing for periods of a month or several months under ordinary conditions of temperature and pressure and even after they have been exposed to elevated temperature of as high as 150° F. which may be encountered in hot electrolytic plating baths. These tablets register not only with each other but also with the original pattern under the same conditions and it is possible furthermore to form several electrotype shells upon a given molded tablet, all of which will register accurately with the pattern, the tablet and each other. From this it will be apparent that these moldable tablets are especially suited for use in forming electrotypes to be used in multicolor printing where accurate registry is of the highest importance. In addition to being free of a tendency to shrink these tablets are also free of any tendency to warp. The metal layer, particularly because of its deformability adds greatly to the strength of the molded tablet. Other advantages of the invention will be apparent from the foregoing description.

It is apparent that many widely different embodiments of this invention may be made without departing from the spirit and scope thereof and therefore it is not intended to be limited except as indicated in the appended claims.

I claim:

1. A moldable tablet adapted to be used in the preparation of electrotypes and comprising two layers of thermoplastic synthetic resinous material moldable at elevated temperature and pressure, both layers having substantially the same uniform thickness throughout their areas, and a core layer of soft sheet metal deformable so as roughly to follow the contour of the molded face of the tablet after molding when said tablet is molded under conditions of temperature and pressure at which said thermoplastic synthetic resinous material is moldable to the image of an electrotype, said core layer being sandwiched tightly between said layers of synthetic resinous material, said metal layer having a thickness between about 0.001 inch and 0.008 inch, and said layers of synthetic resinous material each having a thickness between about 0.010 inch and about 0.028 inch and being united into a unitary structure with said core layer whereby said layers of resinous material are secured against substantial lateral displacement with respect to said metal layer when exposed to a temperature as high as 150° F. at atmospheric pressure.

2. A moldable tablet adapted to be used in the preparation of electrotypes and comprising two layers of thermoplastic synthetic resinous material moldable at elevated temperature and pressure, both layers having substantially the same uniform thickness throughout their areas, and a core layer of soft sheet metal deformable so as roughly to follow the contour of the molded face of the tablet after molding when said tablet is molded under conditions of temperature and pressure at which said thermoplastic synthetic resinous material is moldable to the image of an electrotype, said synthetic resinous material having as a base a solid vinyl chloride-vinylidene chloride copolymer composition containing less than about 20% vinylidene chloride and having a specific gravity of about 1.44, and a specific viscosity of 0.30 measured at 20° C. on a 0.4% solution in nitrobenzene, and also including from about 10% to about 20% by weight, based on the weight of said copolymer, of a mixture of gamma polyvinyl chloride and a butadiene-acrylonitrile copolymer composition, said core layer being sandwiched tightly between said layers of synthetic resinous material, said metal layer having a thickness between about 0.001 inch and 0.008 inch, and said layers of synthetic resinous material each having a thickness between about 0.010 inch and about 0.028 inch and being united into a unitary structure with core layer whereby said layers of resinous material are secured against substantial lateral displacement with respect to said metal layer when exposed to a temperature as high as 150° F. at atmospheric pressure.

3. A moldable tablet adapted to be used in the preparation of electrotypes and comprising two layers of thermoplastic synthetic resinous material moldable at elevated temperature and pressure and containing a parting material in an amount sufficient to produce clean separation from the tablet of an electrotype formed thereon, both layers having substantially the same uniform thickness throughout their areas, and a core layer of soft sheet metal deformable so as roughly to follow the contour of the molded face of the tablet after molding when said tablet is molded under conditions of temperature and pressure at which said thermoplastic synthetic resinous material is moldable to the image of an electrotype, said core layer being sandwiched tightly between said layers of synthetic resinous material, said metal layer having a thickness between 0.001 inch and 0.008 inch, and said layers of synthetic resinous material each having a thickness between about 0.010 inch and about 0.028 inch and being united into a unitary structure with said core layer whereby said layers of resinous material are secured against substantial lateral displacement with respect to said metal layer when exposed to a temperature as high as 150° F. at atmospheric pressure.

4. A moldable tablet adapted to be used in the preparation of electrotypes and comprising two layers of thermoplastic synthetic resinous material moldable at elevated temperature and pressure, both layers having substantially the same uniform thickness throughout their areas, and a core layer of soft sheet aluminum deformable so as roughly to follow the contour of the molded face of the tablet after molding when said tablet is molded under conditions of temperature and pressure at which said thermoplastic synthetic resinous material is moldable to the image of an electrotype, said core layer being sandwiched tightly between said layers of synthetic resinous material, said metal layer having a thickness between about 0.001 inch and 0.008 inch, and said layers of synthetic resinous material each having a thickness between about 0.010 inch and about 0.028 inch and being united into a unitary structure with said core layer whereby said layers of resinous material are secured against substantial lateral displacement with respect to said aluminum layer when exposed to a temperature as high as 150° F. at atmospheric pressure.

5. A moldable tablet adapted to be used in the preparation of electrotypes and comprising two layers of thermoplastic synthetic resinous material moldable at elevated temperature and pressure, both layers having substantially the same uniform thickness throughout their areas, and a core layer of soft sheet copper deformable so as roughly to follow the contour of the molded face of the tablet after molding when said tablet is molded under conditions of temperature and pressure at which said thermoplastic synthetic resinous material is moldable to the image of an electrotype, said core layer being sandwiched tightly between said layers of synthetic resinous material, said copper layer having a thickness between about 0.001 inch and 0.008 inch, and said layers of synthetic resinous material each having a thickness between about 0.010 inch and about 0.028 inch and being united into a unitary structure with said core layer whereby said layers of resinous material are secured against substantial lateral displacement with respect to said copper layer when exposed to a temperature as high at 150° F. at atmospheric pressure.

6. A moldable tablet adapted to be used in the preparation of electrotypes and comprising two layers of thermoplastic synthetic resinous material moldable at elevated temperature and pressure, both layers having substantially the same uniform thickness throughout their areas, and a core layer of soft sheet metal deformable so as roughly to follow the contour of the molded face of the tablet after molding when said tablet is molded under conditions of temperature and pressure at which said thermoplastic synthetic resinous material is moldable to the image of an electrotype, said core layer being sandwiched tightly between said layers of synthetic resinous material, said metal layer having a thickness between about 0.001 inch and 0.008 inch, and said layers of synthetic resinous material each having a thickness between about 0.010 inch and about 0.028 inch and being tightly bonded to the opposite faces of said sheet metal layer throughout substantially their entire area to unite them into a unitary structure with said core layer whereby said layers of resinous material are secured against substantial lateral displacement with respect to said metal layer when exposed to a temperature as high as 150° F. at atmospheric pressure.

7. A moldable tablet adapted to be used in the preparation of electrotypes and comprising two layers of thermoplastic synthetic resinous material moldable at elevated temperature and pressure, both layers having substantially the same uniform thickness throughout their areas, and a core layer of soft sheet metal deformable so as roughly to follow the contour of the molded face of the tablet after molding when said tablet is molded under conditions of temperature and pressure at which said thermoplastic synthetic resinous material is moldable to the image of an electrotype, said core layer being sandwiched tightly between said layers of synthetic resinous material, said metal layer having a thickness between about 0.001 inch and 0.008 inch, and said layers of synthetic resinous material each having a thickness between about 0.010 inch and about 0.028 inch, said core layer having multiple perforations therethrough uniformly distributed throughout the area of the metal sheet and portions of said resinous material extending through said perforations and uniting said layers of resinous material into a unitary structure with said core layer whereby said layers of resinous material are secured against substantial lateral displacement with respect to said metal layer when exposed to a temperature as high as 150° F. at atmospheric pressure.

HERBERT LIBBERTON.

REFERENCES CITED

The following references are of record in the file of this patent:

UNITED STATES PATENTS

| Number | Name | Date |
|---|---|---|
| 922,199 | Schimansky | May 18, 1909 |
| 2,003,494 | Reynolds | June 4, 1935 |
| 2,149,732 | Groff | Mar. 7, 1939 |
| 2,172,564 | Libberton | Sept. 12, 1939 |
| 2,235,782 | Wiley | Mar. 18, 1941 |
| 2,400,518 | Kreber et al. | May 21, 1946 |
| 2,441,940 | Rohdin | May 18, 1948 |
| 2,442,936 | Rohdin | June 8, 1948 |
| 2,528,611 | Saffady | Nov. 7, 1950 |